J. ROBINS.
Rotary Harrow.

No. 19,281.  Patented Feb 2, 1858.

UNITED STATES PATENT OFFICE.

JABEZ ROBINS, OF LEOMINSTER, MASSACHUSETTS, ASSIGNOR TO HIMSELF DANL. R. HAINES, AND S. RICHARDSON.

IMPROVEMENT IN HARROWS.

Specification forming part of Letters Patent No. 19,281, dated February 2, 1858.

*To all whom it may concern:*

Be it known that I, JABEZ ROBINS, of Leominster, in the county of Worcester and State of Massachusetts, have invented an Improved Rotary Wheel-Harrow; and I do hereby declare that the same is fully described and represented in the following specification and the accompanying drawings, of which—

Figure 1:
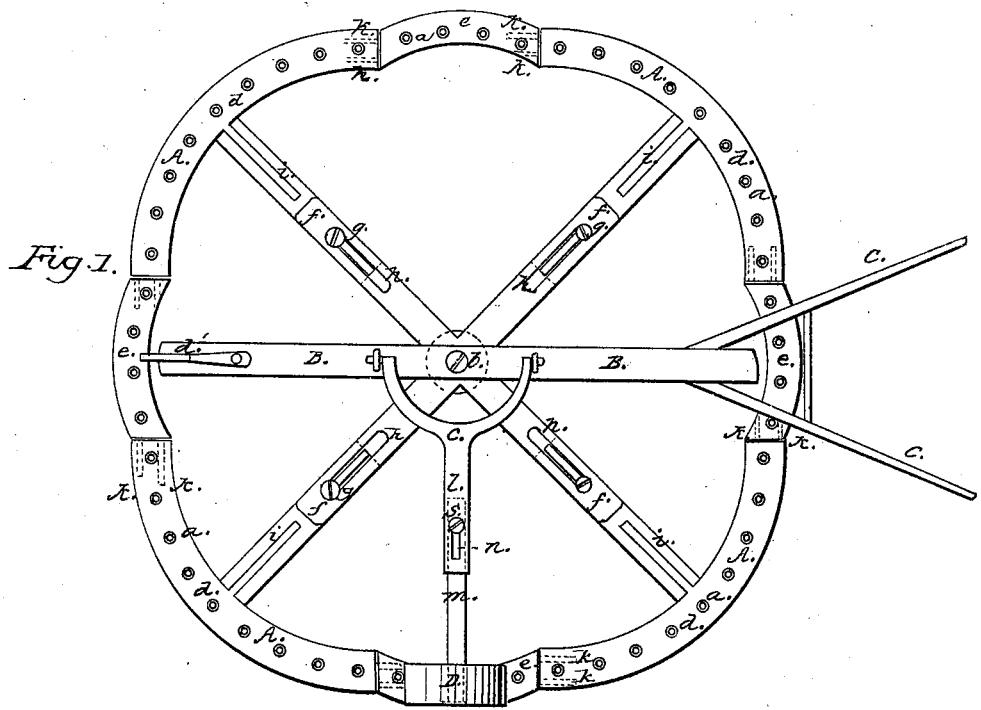
Figure 2:
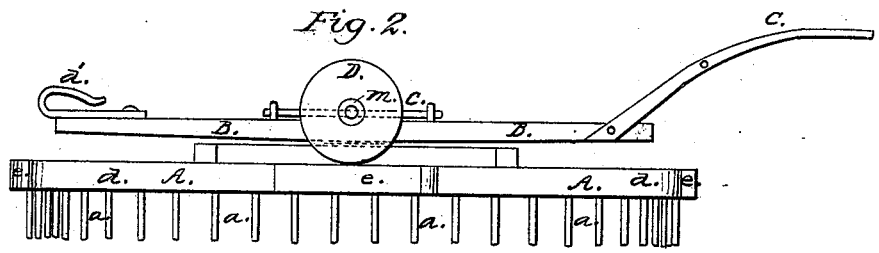
Figure 3:
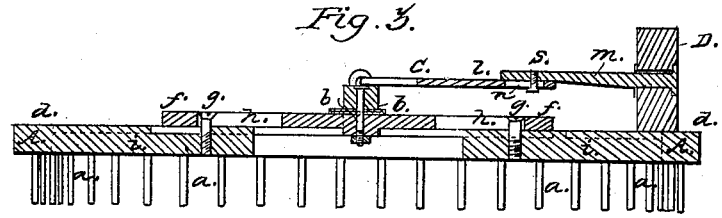

Figure 1 denotes a top view, Fig. 2 a side elevation, and Fig. 3 a longitudinal section, of it.

In these drawings, A represents a horizontal wheel, having a series of teeth or points, $a\ a\ a$, extending vertically from it, as shown in the drawings. This wheel, at its center, is connected with a draft-bar, B, by a journal or pin, $b$, and in such manner as to permit the wheel to freely rotate underneath the draft-bar. Such draft-bar is furnished with two guide-handles, $c\ c$, and a chain-hook, $d'$, arranged at its opposite end, as shown in the drawings; and, furthermore, a forked arm, C, is hinged to the draft-bar and carries a heavy roller-weight, D, which rests on the felly of the wheel, the arm being so connected to the draft-bar as to be capable of being turned over, so as to project from either one side or the other of it. It is on a wheel-harrow of this kind that I have made an improvement, as I shall now proceed to describe, the nature of my improvement consisting in making the rim of the wheel in separate parts or sections, and so applying each or every other section to the center or hub of the wheel as to enable the said section to be adjusted at a greater or less distance from the said center, as occasion may require. Furthermore, under such a construction of the wheel I so apply the weighted roller as to enable it to be adjusted nearer to or farther from the center of the wheel, as may be necessary, in order to have it bear and roll on the rim of the wheel under any change in the diameter of the latter. When the machine is in use the pressure of the weight on one side of the rim, co operating with the power of traction, causes the wheel to revolve while being dragged forward.

In the drawings the wheel-rim is shown as composed of a series of arcs or sections, $d\ d\ d\ d\ e\ e\ e\ e$, every one $d$ of which is connected to an arm, $f$, of a cross or series of arms radiating from one common center or hub, or the equivalent thereof, the connection being by an arm, $i$, extending from the section and affixed to the radial arm by a screw, $g$, going down through a long slot, $h$, (made in the radial arm,) and screwed into the arm $i$. Each lesser arc $e$ abuts end to end against two adjacent arcs, $d\ d$, and fills the gap or space between them, two dowels or pins, $k\ k$, being made to extend from each end of the lesser arc and to enter corresponding holes made in the end of the major arc or section. When the wheel-rim is to be reduced in size the smaller arcs or sections should be removed from the sections $d\ d\ d\ d$, and the latter should be adjusted nearer to the center of the wheel and clamped in position by turning down the clamping-screws $g\ g\ g\ g$.

The furcated arm C, which supports the pressure-wheel, I make in two parts, $l\ m$, furnished with a slot, $n$, and connection-screw S, as shown at Fig. 1, the same enabling the distance of the weighted roller from the center or hub of the wheel to be varied for the purpose above mentioned. The object of making the wheel so as to be reducible in diameter, as set forth, is to enable one wheel to answer for either a large or small harrow, and thus avoid the necessity of a husbandman having two or more harrows of different sizes in order to perform the various kinds of harrowing necessary on an extensive farm.

I do not claim a rotary wheel-harrow; nor do I claim the application of a weight to the draft-bar, so as to rest on one side of the rotary wheel-harrow and by its pressure thereon cause the revolution of the wheel-harrow while it is being drawn forward; nor do I claim a rotary wheel-harrow made with its toothed rim in sections, as shown in the patent numbered 12,659 of the United States patents; but What I do claim is—

1. A rotary wheel-harrow as made with its toothed rim in sections, adjustable with reference to the axis of the wheel, as specified, in order that the dimension of the wheel may be varied, as set forth.

2. With a wheel made adjustable, as specified, so applying the roller-weight to its supporting-arm as to enable the weight to be adjusted nearer to or farther from the center of the wheel and with reference to the adjustable rim, as stated.

In testimony whereof I have hereunto set my signature.

JABEZ ROBINS.

Witnesses:
C. H. MERRIAM,
JAMES BENNETT.